United States Patent
Yao

(10) Patent No.: US 7,124,225 B2
(45) Date of Patent: Oct. 17, 2006

(54) METHOD AND APPARATUS FOR MULTI-INTERRUPT CONTROLLER FOR REDUCING HARDWARE INTERRUPTS TO DSP

(75) Inventor: Chin-Shu Yao, ChangHua Hsien (TW)

(73) Assignee: BenQ Corporation, TaoYuan (TW)

( * ) Notice: Subject to any disclaimer, the term of this patent is extended or adjusted under 35 U.S.C. 154(b) by 197 days.

(21) Appl. No.: 10/885,628

(22) Filed: Jul. 8, 2004

(65) Prior Publication Data
US 2005/0033881 A1    Feb. 10, 2005

(30) Foreign Application Priority Data
Jul. 8, 2003     (TW) ............... 92118539 A

(51) Int. Cl.
*G06F 13/24*    (2006.01)
(52) U.S. Cl. ............ 710/266; 710/263; 710/269
(58) Field of Classification Search ....... 710/260–266, 710/269
See application file for complete search history.

(56) References Cited

U.S. PATENT DOCUMENTS

| | | | |
|---|---|---|---|
| 5,392,435 A * | 2/1995 | Masui et al. | 710/260 |
| 5,805,883 A * | 9/1998 | Saitoh | 718/105 |
| 5,944,840 A * | 8/1999 | Lever | 714/34 |
| 6,185,639 B1 * | 2/2001 | Kailash et al. | 710/48 |
| 6,633,942 B1 * | 10/2003 | Balasubramanian | 710/264 |
| 2002/0116563 A1 * | 8/2002 | Lever | 710/260 |
| 2005/0015766 A1 * | 1/2005 | Nash et al. | 718/102 |

OTHER PUBLICATIONS

RTOS Interrupt Archtectures.*
Determining Worst-Cast RTOS Response Time, RTC Group, 2005.*
Minimizing Interrupt Response Time, Design Strategies and Methodologies, 2005.*

* cited by examiner

*Primary Examiner*—Khanh Dang
(74) *Attorney, Agent, or Firm*—Troxell Law Office PLLC

(57) ABSTRACT

The present inventions provide a controlling device for reducing external interrupts for a processor and the method thereof in a real time system. The controlling device decides whether it should trigger a real interrupt to the processor or combining as many interrupts as possible in one interrupt. The controlling device comprises a buffer, an interrupt controller, and an interrupt recording table. The interrupt controller receives interrupts, then saving information of interrupts to the buffer and reading out limitations of the interrupts, the limitations including interrupt deadlines and processing time of each interrupt. The interrupt recording table stores the limitations of each interrupt. The interrupt controller comprises a timer for counting timing references of the interrupt signals. After receiving an interrupt, the interrupt controller compares the limitations and selectively sends an interrupt signal, a real hardware interrupt, to the processor.

17 Claims, 4 Drawing Sheets

METHOD AND APPARATUS FOR MULTI-INTERRUPT CONTROLLER FOR REDUCING HARDWARE INTERRUPTS TO DSP

FIELD OF TECHNOLOGY

The present inventions relate to a controlling device for reducing the interrupts to a processor and the method thereof and more particularly to a controlling device associated with an interrupt controller and a buffer.

BACKGROUND

Referring to FIG. 1, in a general real time system, when a external device 100, such as I/O device or bus, send an external interrupt request to an processing unit 101, such as CPU, DSP, the processing unit 101 immediately processes the Inter Service Routine (hereafter ISR) corresponding to the interrupt after receiving it.

However, when the external device 100 sends too many interrupts to the processing unit 101 to be processed immediately by the processing unit 101. If the processing unit 101 processes every interrupt requests and processes the corresponding ISR, sometimes, it is easy to reduce the processing speed of a CPU or a DSP. Thus, the system efficiency is decreased and the difficulty of debugging is increased to cause unpredictable interrupt and may reduce the system efficiency.

SUMMARY

To solve the above-noted problem, it is therefore an object of this present invention to provide a controlling device for reducing the interrupts of a processor and the method thereof in order to improve the system efficiency. The controlling device comprises a buffer, an interrupt controller, and an interrupt recording table. The interrupt controller couples to the buffer to receive an interrupt from an external device and selectively sends an interrupt signal out. The buffer stores information corresponding to the interrupt. There is a timer with an initial data in the interrupt controller. The interrupt recording table coupled to the interrupt controller stores the interrupt deadlines and processing time of each interrupt.

When receiving the interrupt, the interrupt controller stores the information corresponding to the interrupt in the buffer, the information including types of the interrupt, parameters, interrupt vector . . . etc, and calculates the difference of the interrupt deadlines of interrupts and the sum of the processing times of interrupts in the buffer and then determines whether sending the interrupt signal out or not according to the result of above calculations.

The controlling method for reducing the interrupts to a processor includes:

a. providing a controlling device, comprising a timer with an initial data, a buffer and an interrupt recording table, b. the controlling device receiving an interrupt from an external device and storing information of the interrupt in the buffer, c. the controlling device reading the interrupt deadlines and processing time of the interrupt and saving them into the interrupt recording table, d. checking whether the timer is equal to a predetermined initial data, if not and the interrupt deadlines are smaller than the sum of processing time of interrupts in the buffer, the controlling device sends the interrupt signal out; if the interrupt deadlines are not smaller than the sum of processing time of interrupts in the buffer, the controlling device compares the sum of each processing time of interrupt in the buffer with the data of the timer and then store the smaller one in the timer, e. if the data of the timer is the initial data, setting the data of the timer as the difference between the interrupt deadlines and the sum the processing time of interrupts, f. checking whether the data of the timer is approached to a second predetermined data; if not, waiting for a predetermined period and repeating step (f); and g. the controlling device sending an interrupt signal to induce an interrupt process and setting the data of the timer for the initial data.

By the above-mentioned controlling device and the method thereof, it can reduce the interrupts of the system in a process, improve the efficiency, and lose no interrupts by the buffer.

DETAILED DESCRIPTION OF PREFERRED EMBODIMENTS

The present inventions provide a controlling device for reducing external interrupts inputting into a processor and the method thereof in order to reduce the interrupts by associating a plurality of interrupt requests without interfering the process of the system.

Figure 1:
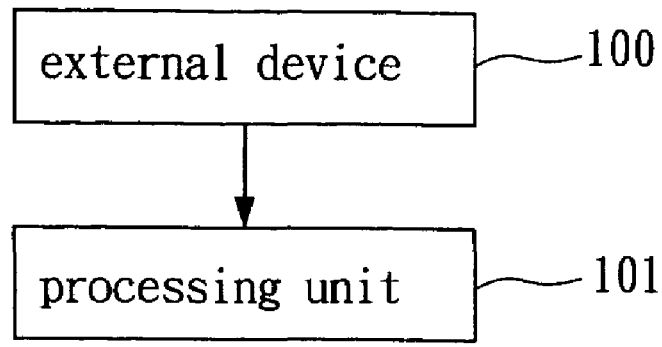
FIG. 1 is an illustrative view of the conventional way for processing the interrupt.
Figure 2:
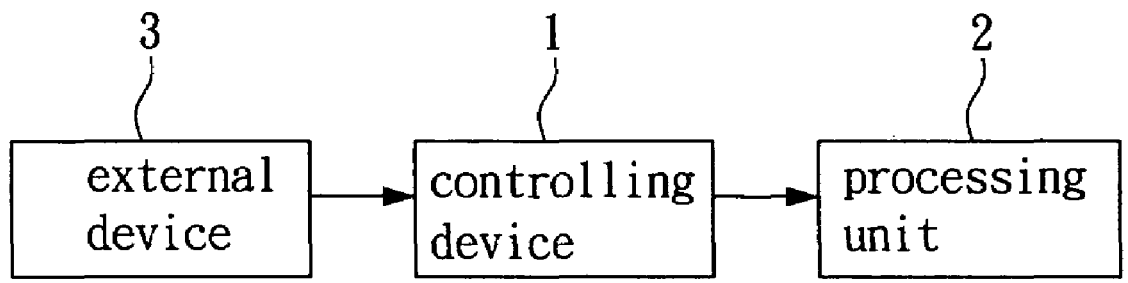
FIG. 2 is an illustrative view of the system for reducing the interrupts to a processor of the present invention in use.

Referring to FIG. 2, a system for reducing the interrupts to a processor of the present invention in use is shown. The system includes: an external device 3, a processing unit 2, and a controlling device 1.

Figure 3:
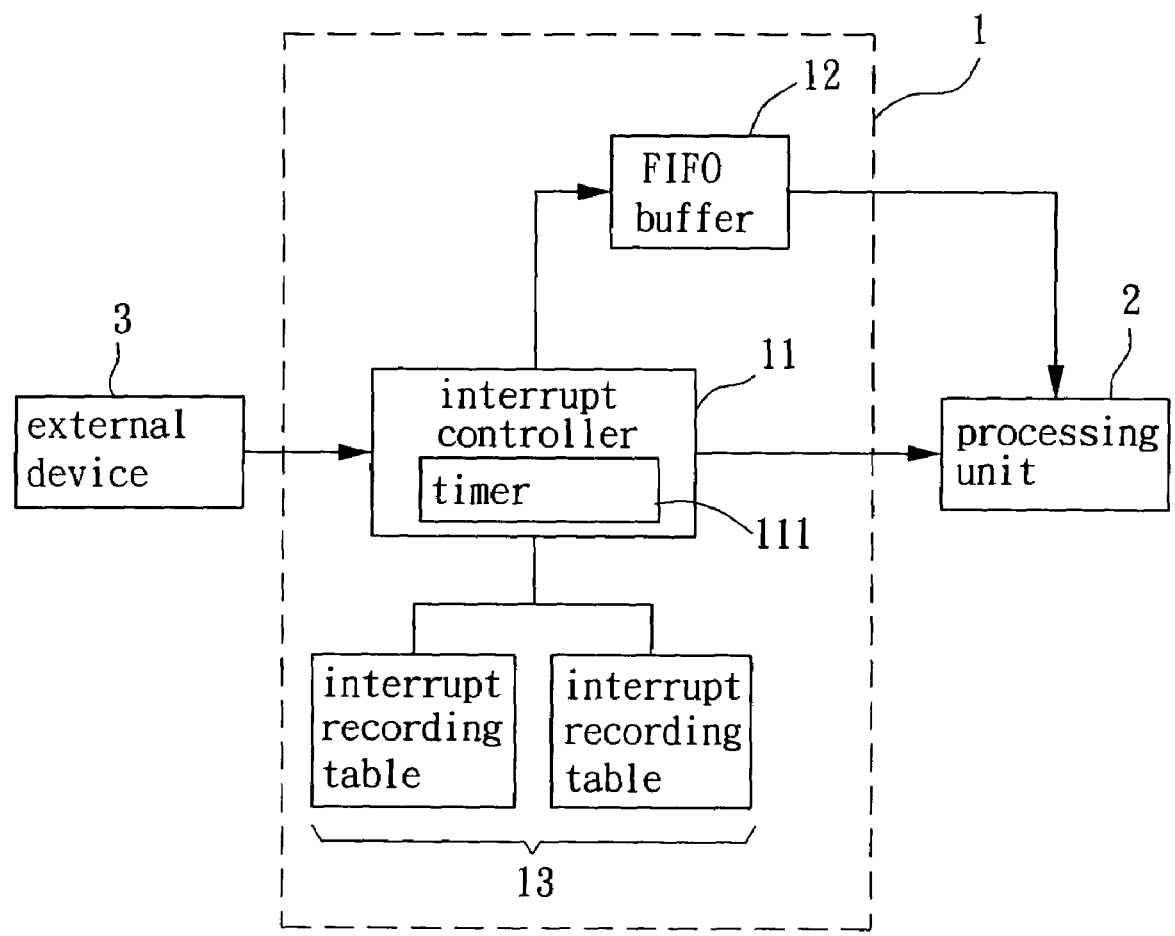
FIG. 3 is a block diagram of the controlling device for reducing the interrupts to a processor of the present invention in use.

FIG. 3 is a block diagram of the controlling device of the preferred embodiment of FIG. 2 in use. The controlling device 1 shown by the way of dotted line in FIG. 3 comprises: a FIFO buffer 12, an interrupt controller 11, and two interrupt recording tables 13. The interrupt controller 11 includes a timer 111 and at least three connecting ends: the first one for connecting the interrupt sent from the external device 3, the second one for sending a real interrupt signal to the processing unit 2 to process interrupt, and the third one for accessing the FIFO buffer 12, when sending out the real interrupt the FIFO also send out the information of the interrupt to the processing unit 2. The timer 111 has an initial data "−1" and a second predetermined data "0". The timer 111 is a counting down timer, which counts down after a predetermined period, i.e. 10 ms. One of the two interrupt recording tables 13 stores a interrupt deadline, and the other one stores a processing time corresponding to each interrupt request separately in order to provide the information to the interrupt controller for determine whether sends the interrupt signal out immediately or not.

For a period of time, from the time point which an interrupt sending from the external device 3 to another time point that the processing unit 2 has to finish all works of the interrupt. The period of time is called an interrupt deadline of the interrupt. If the processing unit doesn't finish all works before the timing point, there may be unpredicted errors happening in the system; moreover. There may be several different interrupt deadlines for different interrupt types. Processing time means working time needed for the processing unit 2 processing all works of an interrupt, which sent, by the external device 3. There may be also several different processing times for different interrupt types, "the longest processing time of interrupt" must be shorter than "the shortest interrupt deadline."

In the preferred embodiment of this invention, we chose the minimal interrupt deadline for our target. And we chose the maximal interrupt processing time for our target.

Figure 4:
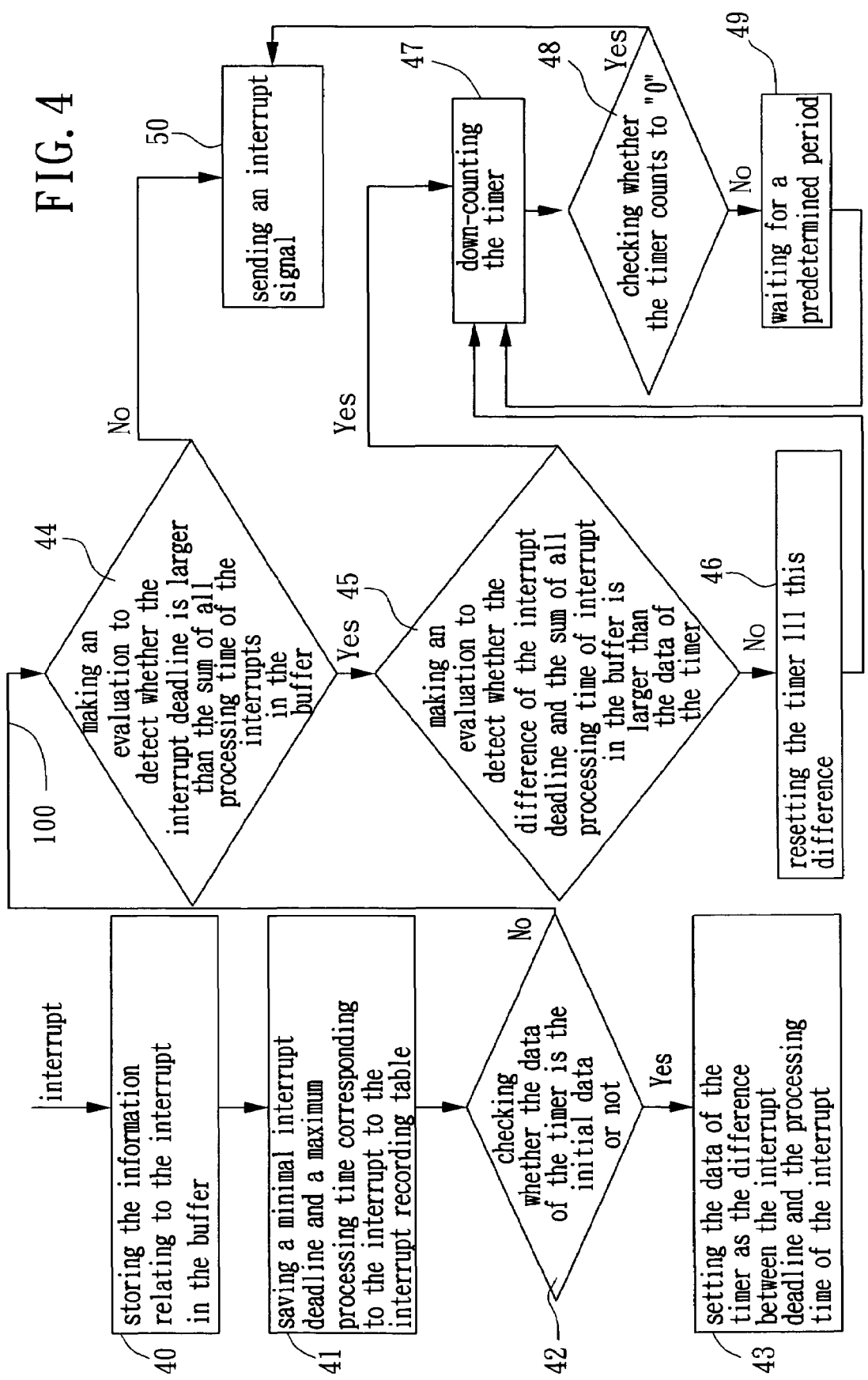
FIG. 4 is a flow diagram of the method for reducing the interrupts to a processor of the present invention in use.

Referring to FIG. 4, the preferred embodiment of the method for reducing the interrupts to a processor of the invention is shown. The method can be applied in the system in FIG. 3, comprising the steps of:

Step 40: the controlling device 1 receiving an interrupt from the external device 3 and storing the information relating to the interrupt, such as types, vectors, etc., in the buffer 12, Step 41: the controlling device 1 saving a minimal interrupt deadline and a maximum processing time corresponding to the interrupt to the interrupt recording tables 13, Step 42: checking whether the data of the timer 111 is the initial data "−1", and taking the step 44 if not, Step 43: setting the data of the timer 111 as the difference between the interrupt deadline and the processing time of the interrupt if the initial data of the timer 111 is "−1," and then the timer 111 starts counting down, Step 44: if the interrupt deadline is larger than the sum of all processing time of the interrupts in the buffer 12; taking the step 45; if not, and taking the step 50 immediately, Step 45: comparing the difference of the interrupt deadline and the sum of all processing time of interrupt in the buffer 12 to the data of the timer 111; if the difference is smaller than the data, taking the step 46 immediately and taking the step 47 if not, Step 46: when the difference is smaller than the data of the timer 111 at present; resetting the timer 111 as this difference, Step 47: the timer 111 counting down, Step 48: checking whether the timer 111 counts to "0"; if not, taking step 49 and then repeating the step 47 until the timer 111 counts to "0,"

Step 49: waiting for a predetermined period; and

Step 50: when the timer 111 counts to "0," the controlling device 1 sending an interrupt signal to induce an interrupt process and resetting the data of the timer 111 for the initial data.

Figure 5:
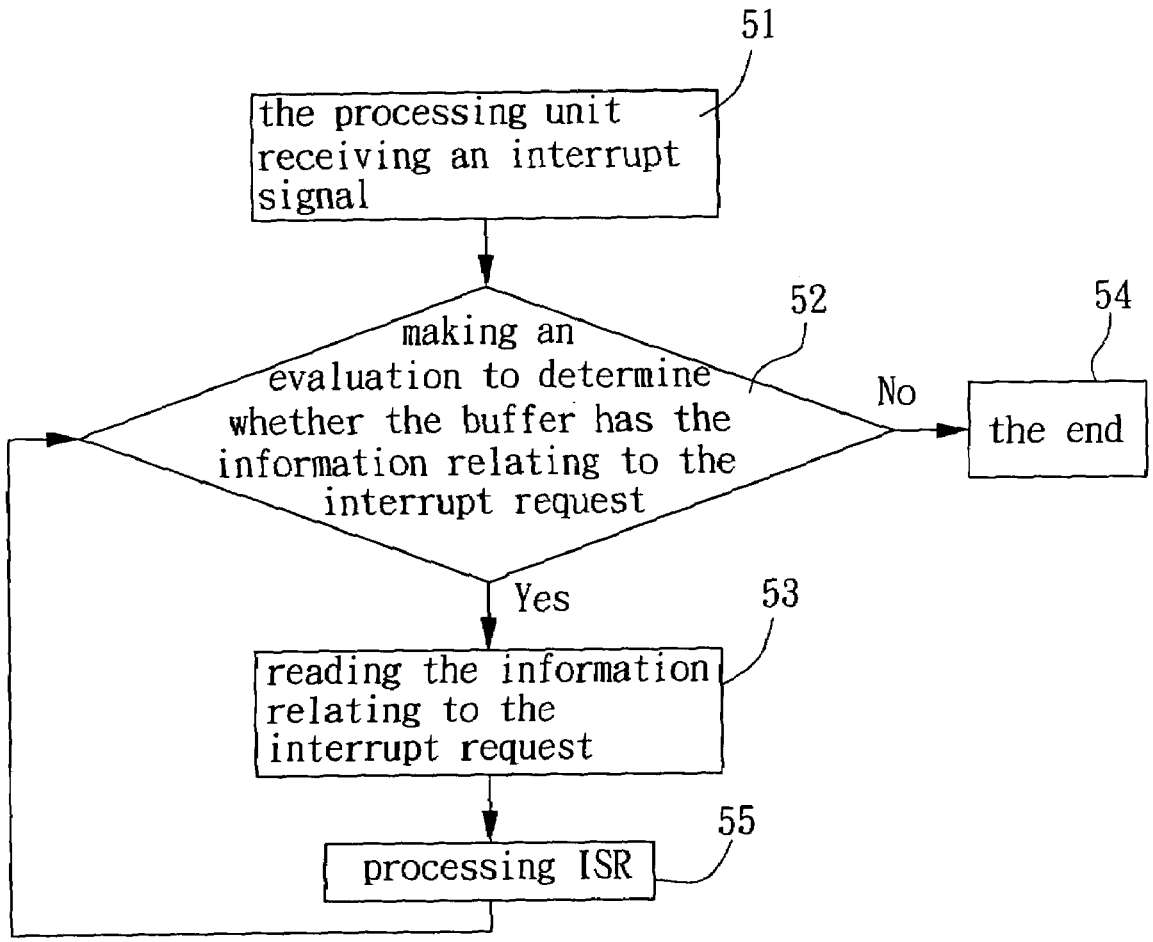
FIG. 5 is a flow diagram of the Interrupt Service Routine for reducing the interrupts to a processor of the present invention in use.

Referring to FIG. 5, a flow diagram of the Interrupt Service Routine for reducing the interrupts to a processor of the present invention is shown. A processing unit 2 is provided, which is a DSP or a CPU, shown in FIG. 5. The process comprises:

Step 51: the processing unit 2 receiving an interrupt signal,

Step 52: the processing unit 2 checking whether the buffer 12 has the information relating to the interrupt request; taking step 54, if "not,"

Step 53: if so, reading the information relating to the interrupt request and taking step 55 until all the information relating to the interrupt request has been processed, Step 54: the end; and Step 55: processing the Interrupt Service Routine (ISR).

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A controlling device for reducing interrupts sending to a processor, said controlling device including:
   a buffer, said buffer being configured to store information corresponding to at least one interrupt,
   an interrupt controller coupling to said buffer, for receiving an first interrupt and storing the information corresponding to said first interrupt into said buffer, and
   an interrupt recording table coupling to said interrupt controller for storing interrupt deadline and processing time corresponding to said at least one interrupt;
   wherein said interrupt controller calculating the difference between interrupt deadline of said first interrupt and sum of processing time of said at least one interrupt and said first interrupt, then said interrupt controller selectively sending an interrupt signal to the processor.

2. The device as claimed in claim 1, wherein said buffer is a FIFO buffer.

3. The device as claimed in claim 1, wherein said information relating to each interrupt stored in said buffer comprises at least types and vectors of said interrupt.

4. The device as claimed in claim 1, wherein said interrupt controller sends said interrupt signal to a processing unit, said interrupt signal is configured to process information of said at least one interrupt in said buffer.

5. The device as claimed in claim 1, wherein when the interrupt deadline of said first interrupt is larger than the sum of processing time of at least one interrupt and said first interrupt, said interrupt controller chooses keeping said interrupt signal in said interrupt controller.

6. the device as claimed in claim 5, when the interrupt deadline of said first interrupt is smaller or equal to the sum of processing time of at least one interrupt and said first interrupt, said interrupt controller sends said interrupt signal out.

7. The device as claimed in claim 1, said interrupt controller further comprising:
   a timer, said timer having a first data and a second data, said first data being an initial data, and when the data of said timer being not equal to said first data, said second data being added to said timer in every predetermined period.

8. The device as claimed in claim 7, wherein said interrupt controller receives said first interrupt and said timer is reset to the difference when the data of said timer is the first data.

9. The device as claimed in claim 7, wherein said interrupt controller receives said first interrupt and said timer is reset to the difference when the data of said timer is not equal to the first data and larger than the difference.

10. The device as claimed in claim 7, when the difference is not larger than a third data, said interrupt controller sends said interrupt signal out and resets said timer to said first data.

11. a method for reducing interrupts sending to a processor including:
   a. providing a controlling device, said controlling device comprising a timer with an initial data, a buffer, b. said controlling device receiving an interrupt and storing information corresponding to said interrupt in said buffer,
c. said controlling device reading an interrupt deadline and a processing time corresponding to said interrupt,
d. checking whether the data of the timer is the initial data, if not and said interrupt deadline is smaller than the sum of all processing time of interrupts in said buffer, sending the interrupt signal to said processor; if the interrupt deadline is not smaller than the sum of each processing time in the buffer, comparing the difference between said interrupt deadline and the sum of each processing time of interrupt in the buffer with the data of the timer and then storing the smaller one in the time,
e. setting the data of said timer as the difference between the interrupt deadline of the interrupt and the processing time of the interrupt when the data of said timer is the initial data,
f. waiting for a predetermined period and repeating this step f, when the data of said timer is calculated to be a second predetermined data; and
g. said controlling device sending an interrupt signal to induce an interrupt process and setting the data of said timer for the initial data.

12. A system for reducing interrupts, said system comprising:
a processing unit;
an external device for providing interrupts to said processing unit,
a controlling device couple to said external device, said controlling device comprising a buffer for storing information relating to interrupts,
an interrupt controller coupling to said buffer; and
an interrupt recording table coupling to said interrupt controller for storing interrupt deadlines and processing times corresponding to interrupts;
wherein said controlling device receiving a first interrupt from said external device, said interrupt recording table storing a first interrupt deadline and a first processing time of said first interrupt, said interrupt controller calculating the difference between said first interrupt deadline of said first interrupt and sum of processing time of interrupts and said first interrupt, then said interrupt controller selectively sending an interrupt signal to said processing unit.

13. The system as claimed in claim 12, wherein said buffer is a FIFO buffer.

14. the system as claimed in claim 12, wherein said information relating to interrupts stored in said buffer comprises at least types and vectors of said interrupts.

15. The system as claimed in claim 12, when the first interrupt deadline is larger than the sum of processing time of interrupts and said first interrupt, said interrupt controller not sending said interrupt signal.

16. The system as claimed in claim 12, when the interrupt deadline of said first interrupt is smaller than the sum of processing time of interrupts and said first interrupt, said interrupt controller sending said interrupt signal.

17. The system as claimed in claim 12, wherein said interrupt controller comprises a timer, of which an initial data is a first data, and when the data of said timer is not equal to said first data, a second data is added to said timer in every predetermined period.

* * * * *